United States Patent
Wilson et al.

(10) Patent No.: US 9,924,710 B1
(45) Date of Patent: Mar. 27, 2018

(54) RETRACTABLE SPOOL AND WATERFOWL DECOY INCORPORATING SAME

(71) Applicants: Mark Wilson, Searcy, AR (US); Dane Smith, Greers Ferry, AR (US)

(72) Inventors: Mark Wilson, Searcy, AR (US); Dane Smith, Greers Ferry, AR (US)

(*) Notice: Subject to any disclaimer, the term of this patent is extended or adjusted under 35 U.S.C. 154(b) by 124 days.

(21) Appl. No.: 15/230,444

(22) Filed: Aug. 7, 2016

Related U.S. Application Data

(60) Provisional application No. 62/288,176, filed on Jan. 28, 2016, provisional application No. 62/202,022, filed on Aug. 6, 2015.

(51) Int. Cl.
| | | |
|---|---|---|
| *A01M 31/06* | (2006.01) | |
| *B65H 75/38* | (2006.01) | |
| *B65H 75/44* | (2006.01) | |

(52) U.S. Cl.
CPC ........... *A01M 31/06* (2013.01); *B65H 75/38* (2013.01); *B65H 75/4431* (2013.01)

(58) Field of Classification Search
CPC .................................................... A01M 31/06
See application file for complete search history.

(56) References Cited

U.S. PATENT DOCUMENTS

| | | | | |
|---|---|---|---|---|
| 1,789,649 A | * | 1/1931 | Gazecki .............. | A01M 31/06 242/385.4 |
| 1,967,902 A | * | 7/1934 | Reichel .............. | A01M 31/06 242/375.3 |
| 2,523,811 A | | 9/1950 | Buehl | |
| 3,079,719 A | * | 3/1963 | Muszynski .......... | A01M 31/06 43/3 |
| 4,056,890 A | * | 11/1977 | Dembski ............. | A01M 31/06 43/3 |
| 4,340,192 A | | 7/1982 | Burris, III | |
| 4,757,630 A | * | 7/1988 | Torberg ............... | A01M 31/06 43/3 |
| 4,826,099 A | | 5/1989 | Johnson | |
| 4,827,653 A | | 5/1989 | Sewell | |
| 5,367,813 A | * | 11/1994 | Cherry ................. | A01M 31/06 43/2 |
| 6,487,811 B2 | | 12/2002 | Barrett | |
| 6,760,993 B2 | | 7/2004 | Lebens | |
| 7,117,628 B1 | * | 10/2006 | Bailey ................. | A01M 31/06 43/3 |
| 7,257,921 B1 | | 8/2007 | Hellmann | |
| 7,322,144 B2 | | 1/2008 | Brewer | |
| 7,475,509 B2 | | 1/2009 | Cagle | |
| 8,584,395 B2 | | 11/2013 | Tonkovich | |
| 9,185,903 B2 | | 11/2015 | Paternostro | |
| 9,386,765 B1 | | 7/2016 | Chatelain et al. | |
| 9,609,860 B1 | | 4/2017 | Slaughter | |
| 9,681,657 B2 | | 6/2017 | Kubinec | |

(Continued)

*Primary Examiner* — Christopher P Ellis

(57) ABSTRACT

A retractable spool reel integrated inside of or attached to a waterfowl decoy comprises a spool and a locking assembly housed inside an internal compartment such that a weighted line wound around the spool may be locked in place at a desired length. The weighted line may be pulled until the locking assembly is set in the locked position. The pulling of the weighted line unwinds the spool and coils a flat spring integrated into the spool. The uncoiling of the flat spring once the line is released allows the line to retract back into the spool once the locking assembly is removed from the locked position.

19 Claims, 4 Drawing Sheets

(56) References Cited

U.S. PATENT DOCUMENTS

| | | | |
|---|---|---|---|
| 9,700,036 B1 | 7/2017 | Chatelain et al. | |
| 9,700,037 B1 | 7/2017 | Chatelain et al. | |
| 2003/0173445 A1* | 9/2003 | Lebens | A01M 31/06 242/385.4 |
| 2004/0163300 A1* | 8/2004 | Pinkston | A01M 31/06 43/3 |
| 2005/0022440 A1 | 2/2005 | Pinkston | |
| 2008/0155879 A1* | 7/2008 | Whipple | A01M 31/06 43/3 |
| 2010/0011650 A1 | 1/2010 | Leonards, Sr. | |
| 2014/0223798 A1* | 8/2014 | Paternostro | A01M 31/06 43/3 |
| 2015/0059227 A1* | 3/2015 | Kubinec | A01M 31/06 43/2 |
| 2015/0059229 A1 | 3/2015 | Miller | |
| 2016/0106090 A1* | 4/2016 | Young | A01M 31/06 43/2 |
| 2016/0324142 A1* | 11/2016 | Stirling | A01M 31/06 |

\* cited by examiner

RETRACTABLE SPOOL AND WATERFOWL DECOY INCORPORATING SAME

CROSS-REFERENCE TO RELATED APPLICATIONS

This application claims the benefit of U.S. Provisional Patent Application No. 62/202,022, filed on Aug. 6, 2015, and entitled "Retractable Spool and Waterfowl Decoy Incorporating Same" and U.S. Provisional Patent Application No. 62/288,176, filed on Jan. 28, 2016, and entitled "Retractable Spool and Waterfowl Decoy Incorporating Same." Such applications are incorporated herein by reference in their entirety.

STATEMENT REGARDING FEDERALLY SPONSORED RESEARCH OR DEVELOPMENT

None

BACKGROUND OF THE INVENTION

Hunting is a popular pastime, with nearly 14 million people hunting annually in the United States. These hunters spend nearly $34 billion annually on various hunting equipment. Many waterfowl hunters in particular purchase decoys, as these are seen as a key piece of equipment to enable the hunter to attract waterfowl to the area being hunted. In recent years, decoys have become ever more sophisticated as a means of better attracting waterfowl to the hunter's desired hunting location.

Waterfowl decoys are designed to float on the top of the water. A well-known problem with decoys is the need to keep the decoy from floating away from the desired area due to wind or currents, which makes the decoys less effective in bringing waterfowl to the desired area, and more difficult for the hunter to recover after the hunt. To hold decoys in place, waterfowl hunters typically tie a length of line to the keel portion of the decoy, with a weight attached at the opposite end of the line. The length of the line is critical, however, since if the line is shorter than the depth of water into which the decoy is placed, then the decoy will float away, and if the line is too long for the depth of water into which the decoy is placed, then the decoys will move about excessively on the water, may become entangled with other decoys, and may not present the desired decoy "spread" intended by the hunter. For this reason, hunters are often required to carry sets of line of varying length in order to accommodate the depths of water they encounter at a desired hunting location. Since waterfowl hunters generally deploy a number of decoys, maintaining a full set of lines in all of the possible required lengths for each decoy is burdensome and expensive.

The art includes a number of efforts to construct waterfowl decoys with variable-length weighted lines in order to alleviate this problem. None of these attempts, however, have proven acceptable and thus have not gained widespread commercial acceptance. An improved method of providing a weighted line of varying length for waterfowl decoys is therefore desired.

BRIEF SUMMARY OF THE INVENTION

The present invention relates to an improved decoy with a retracting line for use in waterfowl decoys. A decoy having a retractable spool reel integral to the decoy is employed so that the correct amount of line can always be extended from the decoy without the need of carrying an abundance of lines of different lengths. The present invention is directed to retractable spool reel that may either be embedded inside the decoy or attached to the keel of the decoy. The retractable spool reel allows the user to pull out the correct amount of line, the line being locked in place by a spring-mounted lock assembly, and is capable of retracting the line back into the decoy when the lock assembly is released, thereby providing convenient storage and preventing the line from becoming tangled.

DETAILED DESCRIPTION OF THE INVENTION

Before the present invention is described in further detail, it should be understood that the invention is not limited to the particular embodiments described and that the terms used in describing particular embodiments are for the purpose of describing those particular embodiments only and are not intended to be limiting, since the scope of the present invention will be limited only by the claims in a subsequent nonprovisional patent application.

Figure 1:
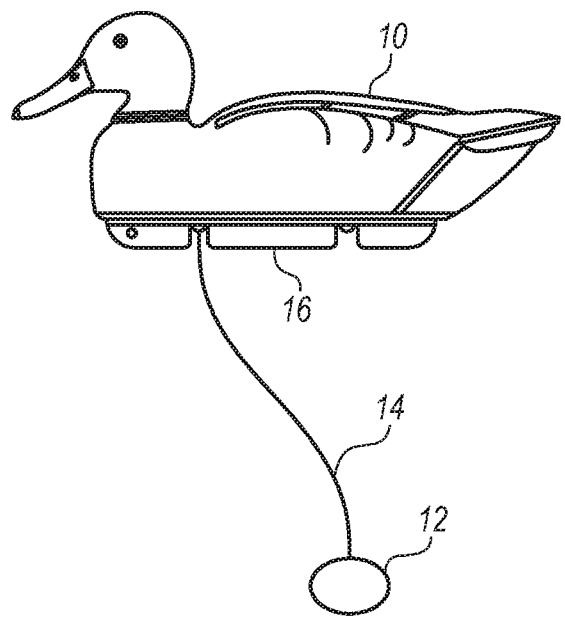
FIG. 1 is a drawing of a duck decoy with the spool assembly housed within the decoy.
Figure 2:
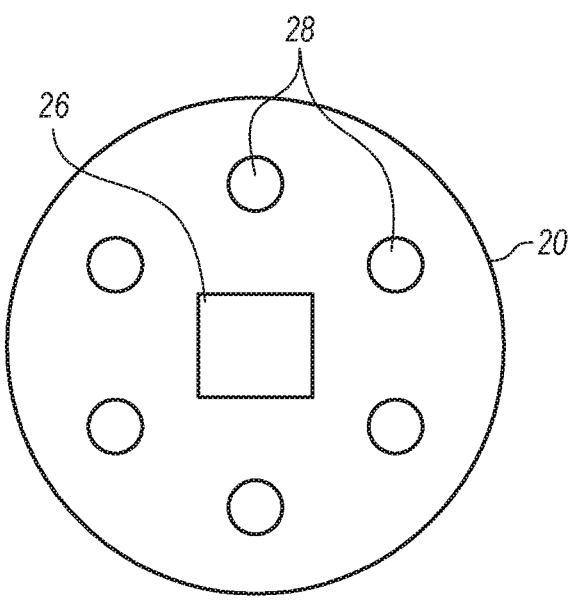
FIG. 2 is a diagram showing a circular surface of the spool assembly.
Figure 6:
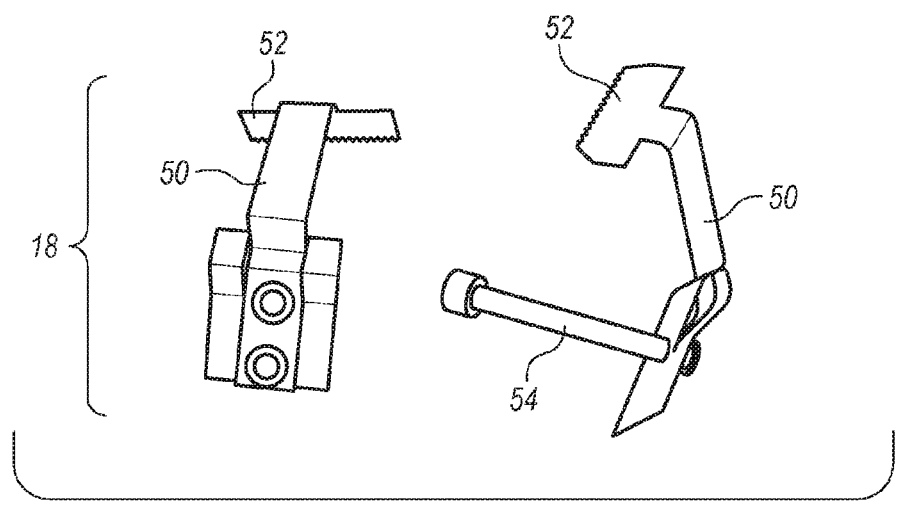
FIG. 6 is a perspective view showing the disassembled serrated clamp assembly.

The present invention is directed toward a retractable spool system that may be embedded in a waterfowl decoy apparatus such that the decoy may be used efficiently in any depth of water due to the retractable spool weight system. The apparatus comprises a retractable spool weight system housed inside the body of a waterfowl decoy 10 as shown in FIG. 1, which floats on the surface of a body of water (not shown in the figures), as the weight 12 is extended to the floor of that body of water. In the preferred embodiment, the retractable spool weight system is mounted within the decoy 10 and sold as a complete system, with the line 14 extending downwardly from the bottom of the keel 16 of the decoy 10. Alternatively, the retractable spool weight system is removably connected to the waterfowl decoy by means of serrated clamp assembly 18, as shown in FIG. 6. This allows the system to be used on existing decoys as a retrofit kit. The position of line 14 extending from the bottom portion of the decoy 10 is important, because if the line were to extend from, for example, the front of the decoy, then the decoy would tend to pitch in the water and exhibit unnatural movement, thus defeating the purpose of the decoy in attracting waterfowl to the hunter's location.

The retractable spool weight system comprises several different components: a spool 20, locking assembly 24, and spool housing 22. For ease of describing the invention in detail, the retractable spool weight system is shown detached from the waterfowl decoy and taken apart in order to describe each component separately in FIGS. 2-5, 7 and 8. The alternative embodiment, where the spool is removably connected to the decoy, also comprises a clamp assembly 18, as shown in FIG. 6.

Figure 5:
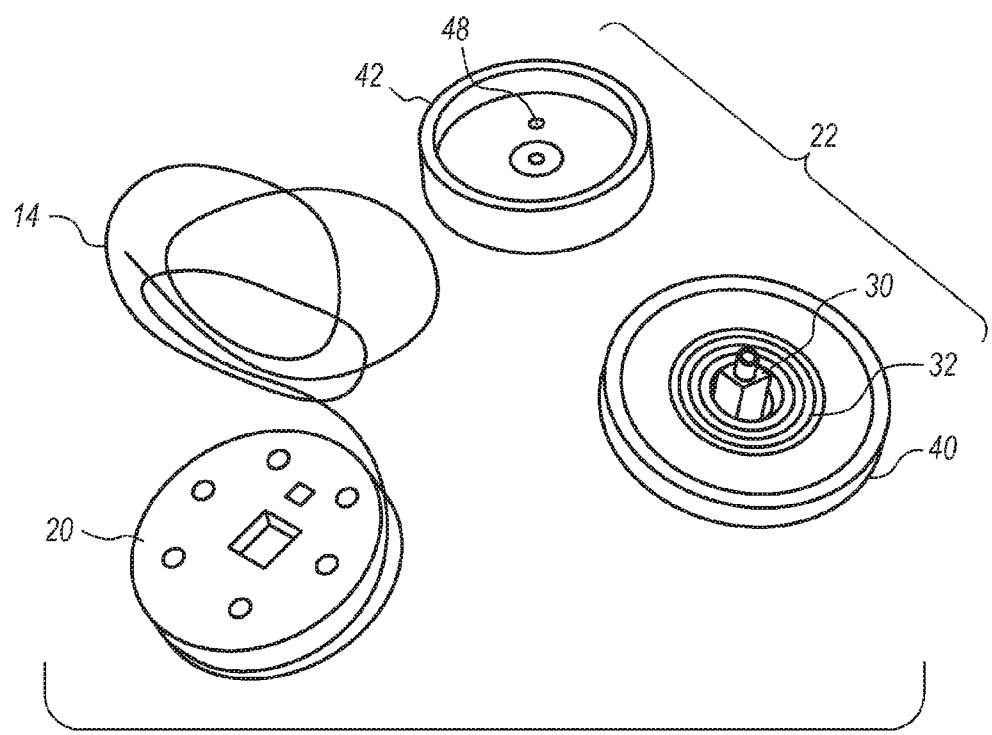
FIG. 5 is a perspective view showing the disassembled spool and housing.

The spool 20 is a cylindrical device on which the retractable line 14 is wound. The spool 20 can be seen in the lower left portion of FIG. 5. A diagram showing the individual components of the spool 20 may be seen in FIG. 2. The spool 20 comprises two circular outer faces, with one circular face adjacent to the deep face plate 42 of the spool housing 22 (described below). Each of the circular faces of the spool 20 has a spool drive hole 26 in the center and the circular face of the spool 20 that is adjacent to the deep face plate 42 has six lock holes 28 equally spaced in a circle around the center drive hole 26. A different number of lock holes 28 may be employed in alternative embodiments. The drive hole is large enough to receive an axle 30, which will drive the spool 20, allowing the winding or unwinding of a line 14 that is wrapped around the spool 20. The axle 30 is attached to a flat spring 32, located inside the internal compartment of the spool housing 22. The flat spring 32 is adjacent to the shallow face plate 40 of the spool housing 22 (described below). The flat spring 32 is coiled around the axle 30, as shown in FIG. 5. As the line is pulled, the axle 30 and spool 20 rotate such that the flat spring 32 is pulled into a tighter coil. As the line 14 is released the flat spring 32 returns to its starting position, thereby spinning the axle 30 and spool 20 in the opposite direction, which causes the line 14 to retract and rewind around the spool 20. In order to set the line 14 to a desired length, the spool 20 (and thus the axle 30) must be locked in a position as to disallow the flat spring 32 to uncoil. The lock holes 28 of the spool 20 work with the locking assembly 24 to lock the spool 20 in place, which keeps the spool 20 from winding or unwinding the line 14, thereby locking the line 14 at a desired length. Axle 30 is preferably square in its cross-sectional shape, and spool drive hole 26 is square-shaped to receive axle 30, but other shapes may be employed in alternative embodiments.

Figure 7:
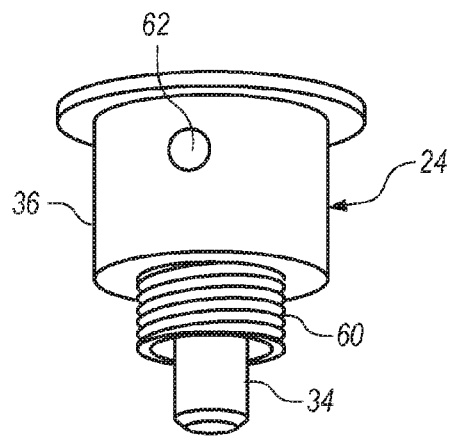
FIG. 7 is a perspective view of the assembled locking assembly.
Figure 8:
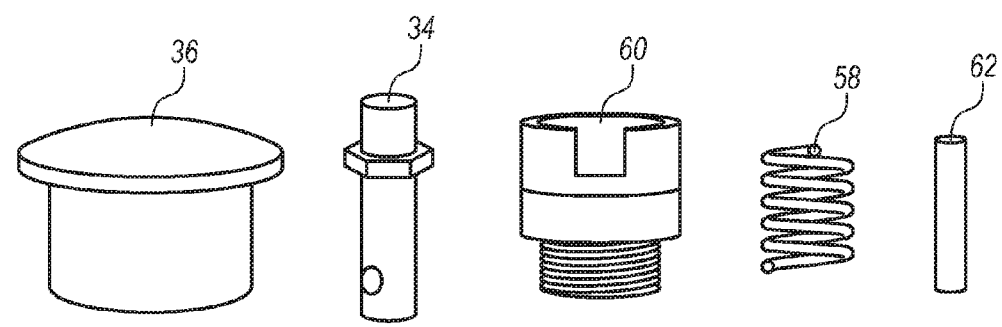
FIG. 8 is a perspective view of the individual components of the locking assembly.

The locking assembly 24 comprises a spring-loaded locking pin 34 attached to a knob 36 which may be operated by the user by pulling and releasing the knob 36. FIGS. 7 and 8 show the components of the locking assembly 24. In its resting position (i.e. when the knob 34 is released) the locking pin 34 engages one of the six lock holes 28 in the surface of the spool 20. In this position, the internal spring 58 of the locking assembly 24 is decompressed such that the locking pin 34 extends through a hole in the spool housing (described below) into one of the six lock holes 28 in the spool 20 surface. Because the spool housing 22 is fixed in place and is not capable of rotating, when the locking pin 34 is extended through the hole in the housing and is engaged in one of the six lock holes 28 in the surface of spool 20, the spool 20 is also prohibited from rotating. Internal spring 58, held in place by spring housing 60, biases knob 36. Roll pin 62 holds spring housing 60 (and internal spring 58) in place within knob 36 by passing horizontally through knob 36 and spring housing 60, thus completing locking assembly 24.

When aiming to extend the line 14 to a desired length, the user may pull the knob 36 away from the surface of the spool housing 22, thereby compressing the internal spring 58 which allows the locking pin 34 to disengage from the lock hole 28, thus allowing the spool 20 to rotate freely. While pulling the knob 36 away from the spool housing 22, the user may simultaneously pull the line 14, causing the spool 20 to rotate until the line 14 reaches the desired length. When the line 14 has reached the desired length, the user releases the knob 36, decompressing the spring 58, which allows the locking pin 34 to return to its resting position. It is understood that the spool 20 may need to be wound or unwound slightly in order for the locking pin 34 to realign with one of the six lock holes 28 in the spools 20 surface. The user may continue pulling the line 14 until the locking pin 34 "clicks" into one of the six lock holes 28, at which point the spool 20 can no longer rotate, thereby locking the line 14 at that particular length. The same technique is used to retract the line 14, except while pulling the knob 36, the user does not pull the line 14, but instead releases the line 14, which allows the coiled flat spring 32 in the spool housing 22 to retract the line 14 into the housing 22 (as described above).

Figure 3:
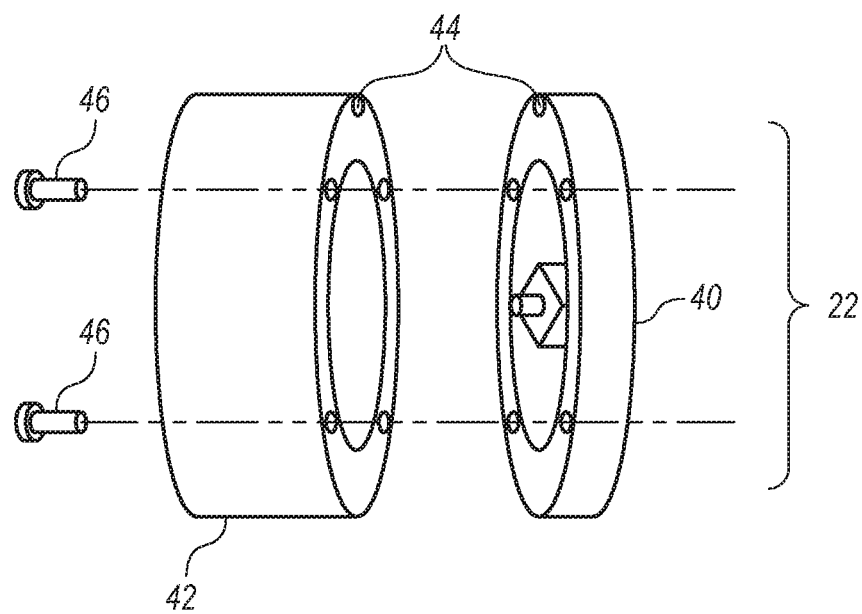
FIG. 3 is a diagram showing the deep component and shallow component of the spool housing, with the dashed lines demonstrating how the components are attached to form a housing.
Figure 4:
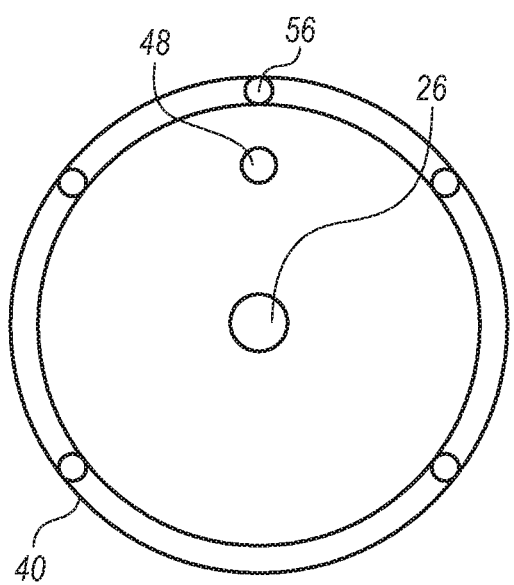
FIG. 4 is a diagram showing a face view of the deep spool housing component.

The spool 20, line 14, and locking assembly 24 are all cased in the spool housing 22. The housing is made up of two face plates, one shallow 40 and one deep 42 (as shown in FIG. 3). A number of housing holes 33 in the edge surface of each component are used to bolt the shallow component 40 and the deep component 42 together (denoted by dashed lines in FIG. 2) by means of bolts 46, thereby creating a hollow internal compartment, which surrounds the spool 20 and locking assembly 24 components. FIG. 5 shows the two separate components of the spool housing assembly. The shallow component 40 and deep component 42 each have a center hole capable of receiving axle 30 (see FIG. 4), which is used to drive the spool 20 during winding and unwinding. The internal compartment of the housing 22 is capable of storing the wound line 14 when the line 14 is retracted. An additional locking pin hole 48 in the surface of the deeper housing component 42 is capable of receiving the locking pin 34 when the knob 36 is released (as described above). This locking pin hole 48 works in conjunction with the lock holes 28 in the surface of the spool 20 to prohibit the spool 20 from rotating, such that the line 14 may be locked at a particular length. In one embodiment, a separate hole in the surface of each component is used to attach the serrated clamp 18 to the spool housing 22, such that the housing 22 and internal components can be attached externally to the keel 16 of the decoy 10.

As noted above, in one embodiment, a serrated clamp assembly 18 is used to attach the spool housing 22 (and internal components) to the keel 16 of the duck decoy 10. FIG. 6 shows the clamp assembly 18 in disassembled form for clarity. The clamp assembly 18 is made up of two arms 50, each arm a mirror image of the other. Attached to one end of each arm 50 is the serrated clamp head 52, as shown in FIG. 6. This component has a serrated edge that allows the clamp to "grab" the keel 16 of the decoy 10 such that the housing assembly (and internal components) will not detach from the decoy without the use of force by the user. FIG. 6 also shows the mechanism for attaching the spool housing 22 to the clamp 19. As shown, a clamp bolt 54 is capable of extending through the surface on the opposite end of the clamp arms 50 as the serrated end. The bolt 54 will extend from through one clamp arm 50, then extend through the clamp hole 56 in each of the housing assembly surfaces 40, 42, and then extend through the other clamp arm 50, where a nut is attached to hold the assembly together.

Unless otherwise stated, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein. It will be apparent to those skilled in the art that many more modifications are possible without departing from the inventive concepts herein.

The invention claimed is:

1. A retractable spool weight system for use with a waterfowl decoy, comprising:
   a. a housing comprising a deep face plate and a shallow face plate, wherein said deep face plate and said shallow face plate are attached to form an internal compartment;
   b. a spool inside said internal compartment of said housing, said spool comprising a first circular outer face and a second circular outer face, wherein said first of said outer faces of said spool comprises a plurality of spool lock holes, further wherein said first of said outer faces of said spool is adjacent to said deep face plate of said housing;
   c. a line comprising a first end and a second end, wherein said first end of said line is wrapped around said spool;
   d. a weight attached to said second end of said line, wherein said weight is external to said housing;
   e. an axle hole extending through the centers of said outer surfaces of said spool, thereby creating a bore through the center of said spool;
   f. an axle removably inserted into said axle hole of said spool thereby allowing said spool to rotate around said axle in an unwinding direction when said line is pulled;
   g. a flat spring inside said internal compartment of said housing, wherein said flat spring is adjacent to said shallow face plate, further wherein said flat spring is coiled around said axle, further wherein the flat spring is pulled into a tighter coil when said spool rotates in said unwinding direction, further wherein said flat spring uncoils when said line is released, thereby rotating said spool in a winding direction, thereby retracting a portion of the line into said housing; and
   h. a locking assembly attached to said deep face plate of said housing, said locking assembly comprising a spring-loaded knob having a locked position and an unlocked position, wherein the spool cannot rotate in the winding direction or the unwinding direction when said knob is in said locked position, thereby locking said line at a desired length.

2. The retractable spool weight system of claim 1, wherein said deep face plate comprises a housing lock hole.

3. The retractable spool weight system of claim 2, wherein the locking assembly further comprises a locking pin connected to said knob.

4. The retractable spool weight system of claim 3, wherein the locking pin extends through said housing lock hole.

5. The retractable spool weight system of claim 4, wherein the locking pin extends through one of said plurality of spool lock holes when said knob is in said locked position, thereby prohibiting said spool from rotating.

6. The retractable spool weight system of claim 5, wherein said locking pin is removed from said one of said plurality of spool lock holes when said knob is in said unlocked position, thereby allowing said spool to rotate freely.

7. A waterfowl decoy and retractable spool weight system comprising:
   a. a housing comprising a deep face plate and a shallow face plate, wherein said deep face plate and said shallow face plate are attached to form an internal compartment;
   b. a spool inside said internal compartment of said housing, said spool comprising a first circular outer face and a second circular outer face, wherein said first of said outer faces of said spool comprises a plurality of spool lock holes, further wherein said first of said outer faces of said spool is adjacent to said deep face plate of said housing;
   c. a line comprising a first end and a second end, wherein said first end of said line is wrapped around said spool;
   d. an axle hole extending through the centers of said outer surfaces of said spool, thereby creating a bore through the center of said spool;
   e. an axle removably inserted into said axle hole of said spool thereby allowing said spool to rotate around said axle in an unwinding direction when said line is pulled;
   f. a flat spring inside said internal compartment of said housing, wherein said flat spring is adjacent to said shallow face plate, further wherein said flat spring is coiled around said axle, further wherein the flat spring is pulled into a tighter coil when said spool rotates in said unwinding direction, further wherein said flat spring uncoils when said line is released, thereby rotating said spool in a winding direction, thereby retracting a portion of the line into said housing;
   g. a locking assembly attached to said deep face plate of said housing, said locking assembly comprising a spring-loaded knob having a locked position and an unlocked position, wherein the spool cannot rotate in the winding direction or the unwinding direction when said knob is in said locked position, thereby locking said line at a desired length;
   h. a decoy comprising a hollow body compartment, wherein said housing is situated inside said hollow body compartment of said decoy, further wherein said hollow body compartment of said decoy comprises an aperture for receiving said line, thereby allowing said line to extend through said hollow body compartment of said decoy; and
   i. a weight attached to said second end of said line, wherein said weight is external to said housing, further wherein said weight is external to said hollow body compartment of said decoy.

8. The waterfowl decoy and retractable spool weight system of claim 7, wherein said deep face plate comprises a housing lock hole.

9. The waterfowl decoy and retractable spool weight system of claim 8, wherein the locking assembly further comprises a locking pin connected to said knob.

10. The waterfowl decoy and retractable spool weight system of claim 9, wherein the locking pin extends through said housing lock hole.

11. The waterfowl decoy and retractable spool weight system of claim 10, wherein the locking pin extends through said housing lock hole.

12. The waterfowl decoy and retractable spool weight system of claim 11, wherein the locking pin extends through one of said plurality of spool lock holes when said knob is in said locked position, thereby prohibiting said spool from rotating.

13. The waterfowl decoy and retractable spool weight system of claim 12, wherein said locking pin is removed from said one of said plurality of spool lock holes when said knob is in said unlocked position, thereby allowing said spool to rotate freely.

14. A retractable spool weight system for connecting to a waterfowl decoy having a keel, the retractable spool weight system comprising:

a. a housing comprising a deep face plate and a shallow face plate, wherein said deep face plate and said shallow face plate are attached to form an internal compartment;
b. a clamping system comprising a clamp, wherein said clamp comprises two clamp arms, wherein each clamp arm comprises a first end and a second end, wherein said first end of each clamp arm comprises a serrated clamp head, further wherein said serrated clamp head of each clamp arm removably attaches to said keel of said decoy, further wherein said second end of each clamp arm is removably attached to said housing, thereby removably attaching said housing to said keel of said decoy;
c. a spool inside said internal compartment of said housing, said spool comprising a first circular outer face and a second circular outer face, wherein said first of said outer faces of said spool comprises a plurality of spool lock holes, further wherein said first of said outer faces of said spool is adjacent to said deep face plate of said housing;
d. a line comprising a first end and a second end, wherein said first end of said line is wrapped around said spool;
e. a weight attached to said second end of said line, wherein said weight is external to said housing;
f. an axle hole extending through the centers of said outer surfaces of said spool, thereby creating a bore through the center of said spool;
g. an axle removably inserted into said axle hole of said spool thereby allowing said spool to rotate around said axle in an unwinding direction when said line is pulled;
h. a flat spring inside said internal compartment of said housing, wherein said flat spring is adjacent to said shallow face plate, further wherein said flat spring is coiled around said axle, further wherein the flat spring is pulled into a tighter coil when said spool rotates in said unwinding direction, further wherein said flat spring uncoils when said line is released, thereby rotating said spool in a winding direction, thereby retracting a portion of the line into said housing; and
i. a locking assembly attached to said deep face plate of said housing, said locking assembly comprising a spring-loaded knob having a locked position and an unlocked position, wherein the spool cannot rotate in the winding direction or the unwinding direction when said knob is in said locked position, thereby locking said line at a desired length.

15. The retractable spool weight system of claim 14, wherein said deep face plate comprises a housing lock hole.

16. The retractable spool weight system of claim 15, wherein the locking assembly further comprises a locking pin connected to said knob.

17. The retractable spool weight system of claim 16, wherein the locking pin extends through said housing lock hole.

18. The retractable spool weight system of claim 17, wherein the locking pin extends through one of said plurality of spool lock holes when said knob is in said locked position, thereby prohibiting said spool from rotating.

19. The retractable spool weight system of claim 18, wherein said locking pin is removed from said one of said plurality of spool lock holes when said knob is in said unlocked position, thereby allowing said spool to rotate freely.

* * * * *